US007254831B2

(12) United States Patent
Saunders et al.

(10) Patent No.: US 7,254,831 B2
(45) Date of Patent: *Aug. 7, 2007

(54) SHARING A SIGN-IN AMONG SOFTWARE APPLICATIONS HAVING SECURED FEATURES

(75) Inventors: Stillman T. Saunders, Sammamish, WA (US); Ignacio Ariel Coloma, Sammamish, WA (US); Vishal Gupta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 733 days.

This patent is subject to a terminal disclaimer.

(21) Appl. No.: 10/309,651

(22) Filed: Dec. 4, 2002

(65) Prior Publication Data

US 2004/0111644 A1 Jun. 10, 2004

(51) Int. Cl.
*G06F 21/00* (2006.01)
(52) U.S. Cl. ............... 726/8; 726/5; 726/6; 726/7; 713/165; 713/166; 713/167
(58) Field of Classification Search ............. 713/164, 713/156, 165–167; 705/76; 709/229; 726/5–10
See application file for complete search history.

(56) References Cited

U.S. PATENT DOCUMENTS

| 5,774,551 | A  | * | 6/1998 | Wu et al. ............ 713/155 |
| 6,182,142 | B1 |   | 1/2001 | Win et al. ........... 709/229 |
| 6,718,332 | B1 | * | 4/2004 | Sitaraman et al. ..... 707/102 |
| 6,904,526 | B1 | * | 6/2005 | Hongwei ............. 713/182 |
| 2001/0054157 | A1 | * | 12/2001 | Fukumoto ........... 713/201 |
| 2002/0023059 | A1 |   | 2/2002 | Bari et al. ........... 705/76 |

(Continued)

FOREIGN PATENT DOCUMENTS

WO    WO 00/54151    9/2000

OTHER PUBLICATIONS

Simon Chu et al., "Web-Based Single Sign-On Solutions: An SSO Product Matrix," Computer Security Journal, vol. XVI, pp. 39-49, Nov. 1, 2000.
David P. Kormann et al., "Risks of the Passport Single Signon Protocol," Computer Networks 33, pp. 51-58, 2000.
Official Action in U.S. Appl. No. 10/309,650, dated Oct. 27, 2006 (7 pages).
Official Action in U.S. Appl. No. 10/309,650, dated Mar. 27, 2007 (8 pages).

*Primary Examiner*—Kambiz Zand
*Assistant Examiner*—Tongoc Tran
(74) *Attorney, Agent, or Firm*—Merchant & Gould

(57) ABSTRACT

In the present invention, when one open or running software application having secured features enters an access signed-in or logged-in state, other open or running software applications having secured features enter a ready signed-in state automatically, without prompting user intervention. The same operation that signed-in or logged-in the initial software application will transition other software applications that are presently open, active to run, or that start in run mode to a ready signed-in state. The access signed-in state fully authenticates the user's identity and grants access to secured features. The ready signed-in state places the software application in a state of readiness to authenticate and access secured features without prompting user intervention. One feature of the present invention is the sharing of a sign-in or login credential (e.g. username and password) and the processing of the shared credential in order to provide a universal, shared sign-in session between open software applications having secured features. This feature helps provide a user experience that in effect, has only one sign-in or login session for software applications with secured features.

26 Claims, 7 Drawing Sheets

U.S. PATENT DOCUMENTS

| | | | |
|---|---|---|---|
| 2002/0032731 A1 | 3/2002 | Qian et al. | 709/204 |
| 2002/0095571 A1 | 7/2002 | Bradee | 713/164 |
| 2003/0163513 A1* | 8/2003 | Schaeck et al. | 709/201 |
| 2003/0226017 A1* | 12/2003 | Palekar et al. | 713/168 |
| 2004/0103202 A1* | 5/2004 | Hildebrand et al. | 709/229 |
| 2004/0111620 A1* | 6/2004 | Saunders et al. | 713/182 |

* cited by examiner

SHARING A SIGN-IN AMONG SOFTWARE APPLICATIONS HAVING SECURED FEATURES

TECHNICAL FIELD

The present invention generally relates to methods and systems that authenticate the identity of users or computing devices. More specifically, the present invention relates to a method, system, and apparatus for sharing a sign-in operation among software applications having secured features

BACKGROUND

Today's software applications are manufactured with secured network service capability that requires users and computers to verify their identity by signing-in to access secured features within software applications and thereby connecting to authentication services.

Authentication services such as PASSPORT.NET available from MICROSOFT CORPORATION of Redmond, Wash. are becoming an integral part of software applications needing to authenticate users for access to secured features. These authentication services control access to secured features within software applications and provide identity and authentication services for network users. For instance, a secured network fax service used from within a word processing application would require the entry of a username and password to authenticate the identity of a user and authorize use of the network fax service. Once identity is authenticated, the authentication operation acts as an authentication gateway by allowing users to securely access network services within the word processing application without entering a username and password at every network service or website they access during the signed-in session.

However users of a family of software applications each having secured features must still enter a username and password or click a sign-in button to initially reach a signed-in state within each software application. One drawback of current sign-in operations is their pervasiveness, requiring repetitive user intervention with user interface prompts to sign-in for access to secured software features. This must be done every time a user signs-in to one of the software applications with secured features. For instance, if a user wants to access the secured features of WORD, EXCEL, and POWER POINT from MICROSOFT CORPORATION of Redmond, Wash., the user must start each software application and either type in a username and password or click on an interface button to enter a saved password for every application. Because each software application has a separate sign-in prompt, repeatedly signing-in to utilize secured features has an annoying affect on users who access secured features on a regular basis.

It is with respect to these considerations and others that the present invention has been made.

SUMMARY OF THE INVENTION

In accordance with the present invention, the above and other problems are solved by sharing a sign-in operation among software applications having secured features. In the present invention, when one open or running software application having secured features enters an access signed-in state, other open or running software applications having secured features enter a ready signed-in state without prompting user intervention. The same operation that signed-in the initial open or running software application will transition other software applications, that are presently open, active to run, or that start in run mode, to a ready signed-in state. The access signed-in state fully authenticates the user's identity and grants access to secured features. The ready signed-in state places the software application in a state of readiness to authenticate and access secured features without prompting user intervention.

One feature of the present invention is the sharing of a sign-in credential (e.g. username and password) and the processing of the shared credential in order to provide a universal, shared sign-in session between open software applications having secured features. This feature helps provide a user experience that in effect, has only one sign-in session for software applications with secured features. When a user signs-in to a secured software application their sign-in credential is authenticated and shared with other applications that provide secured features.

This feature especially useful for a suite of software applications having or providing secured features, such as MICROSOFT OFFICE available from MICROSOFT CORPORATION of Redmond, Wash. A user may actively sign-in once to a secured suite application and their sign-in credential may be stored in memory and used to transition other secured suite applications, that are presently open, in run mode, or that subsequently open or start up to run, from a ready signed-in state to an access signed-in state. This eliminates the need for a user to reenter their credential to sign-in for access to secured features within a software application. This also enhances the ability of the software applications in the suite to work well together.

Another feature of the present invention is that after a software application enters an access signed-in state, each open or running software application actually enters a ready signed-in state in an asynchronous fashion, however this is done in a manner that is practically transparent to the user. When a software application enters an access signed-in state, other open or running software applications receive a message or notification indicating the state in a non-intrusive manner. Next, each open or running software application transitions to a ready signed-in state one at a time. Further, as other software applications having secured features open or start-up to run, a test or detection is made as to whether an application has entered an access signed-in state. If an access signed-in state is present or exists, the opening or starting software applications asynchronously transition to a ready signed-in state. As a result, unnecessary and repetitive steps are avoided when signing-in and intrusive prompts and sign-in dialogs at random are less likely while using the software applications.

In another feature of the present invention, credential information is stored in an encrypted format. The credential, which is stored in a shared memory, is authenticated before being shared and is authenticated again when a software application utilizes it to transition or advance from a ready signed-in state to an access signed-in state. During this transition the memory for the software application receives an encrypted cookie from an authentication server to provide or grant access to secured features within the software application.

Another feature of the present invention is the number of applications in a signed-in state at any time is monitored or accounted for with a reference count such that when the number reaches zero the shared memory is cleared. This prevents shared sign-ins based on an unauthorized application entering a signed-in state.

Another feature of the present invention is the sharing of a sign-out after sharing a sign-in operation. As a secured software application in an access or ready signed-in state transitions to a signed-out state, the credential and encrypted cookie are removed from the memory for the application if the application is transitioning from an access signed-in state, other open or running applications are notified of the sign-out, the reference count is decremented for each application signing-out, and the interface of the application is changed to a signed-out state. This keeps users and other applications informed of the status of each application. Subsequently, each open or running software application in an access or ready signed-in state asynchronously decrements the reference count and changes their interface to a signed-out state. This eliminates the need to actively sign-out out of every secured application.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier, readable by a computing system and encoding a computer program of instructions for executing a computer process.

An advantage of the present invention is that network efficiency is improved because network transmissions are executed on an as needed basis. Although some secured software applications may be in a ready signed-in state, network traffic is reduced by executing network transmissions only when a secured feature is requested and the applications transition to an access signed-in state.

Another advantage of the present invention is that unauthorized applications are prohibited from sharing the sign-in operation thereby preventing sign-in attacks. Applications that do not participate in shared sign-in do not contain the necessary code to access the application program interface (API) required to share a sign-in.

The great utility of the invention is the sharing of a sign-in and thereby a sign-out operation among a family or suite of software applications with secured features such as OFFICE available from MICROSOFT CORPORATION of Redmond, Wash. This alleviates the need for users to manually sign-in or sign-out of each secured application after successfully signing-in or signing-out of the initial secured application.

These and various other features as well as advantages, which characterize the present invention, will be apparent from a reading of the following detailed description and review of the associated drawings.

DETAILED DESCRIPTION

Figure 1:
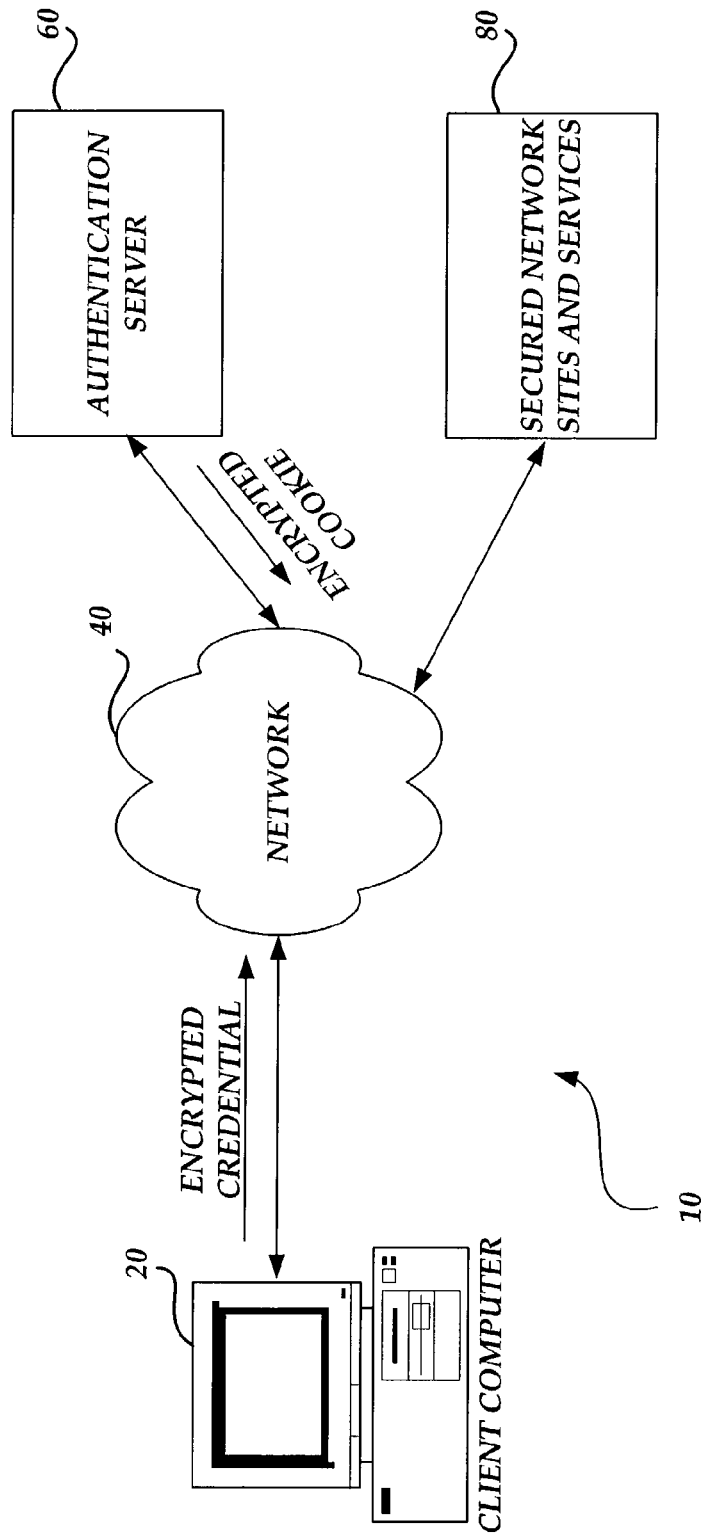
FIG. 1 is a diagram illustrating system architecture utilized in an actual embodiment of the present invention.

Referring to FIG. 1, an illustrative diagram showing a system architecture 10 utilized in an actual embodiment of the present invention will be described. As shown in FIG. 1, a client computer 20 is provided that connects to an authentication server 60 through a network 40. According to one actual embodiment described herein, the client computer 20 comprises a standard personal computer that connects to a network 40, such as the Internet, through a connection, such as a Digital Subscriber Line or a cable modem. However, it should be appreciated that the client computer 20 may comprise another type of computing device such as Personal Digital Assistant (PDA) and may be connected to the network 40 through another type of connection, such as a dial up or satellite connection.

The client computer 20 is capable of executing a standard Web browser application program such as INTERNET EXPLORER from MICROSOFT CORPORATION of Redmond, Wash. The Web browser application program may be utilized to access secured network sites and services 80 if the personal or client computer 20 has an authenticated credential. A credential is authenticated after the client computer 20 transmits the encrypted credential to the authentication server 60 through the network 40. The authentication server 60 authenticates the identity of users before granting a user access to secured host services or websites 80. For instance, before a user of client computer 20 may access a secured faxing or printing service within a word processing software application with these secured features, the user must submit a credential (e.g. username and password) to the authentication server 60 via the network 40.

Client computer 20 prompts the user to sign-in or login with a credential when a secured feature within the software application is requested. When one application enters an access signed-in or logged-in state, the other open or running secured software applications receive notice of the sign-in and subsequently enter a ready signed-in or logged-in state. Once a software application reaches the ready signed-in state on client computer 20, the necessity of user intervention to enter a credential to access a secured feature is removed and the software application may transition or advance to an access signed-in state without prompting action on the part of the user. When using an application in the ready signed-in state, simply requesting access to a secured feature initiates the sign-in process. During the sign-in or login process the encrypted credential, initially used to sign-in the application presently in the access signed-in state, will be acquired or retrieved from shared memory by the application requesting access to a secured feature and transmitted to authentication server 60.

Once the credential is verified or validated by the authentication server 60, the authentication server 60 returns an encrypted cookie to the client computer 20 where it is stored in the memory for the application that requested it. The encrypted cookie gives the client computer 20 access to secured host services and websites. Receiving the encrypted cookie places the software application in an access signed-in or logged-in state and client computer 20 may access secured sites and services through the software application via the network 40 without authenticating the credential again during a signed-in or logged-in session. However, if the user logs-out, exits, or signs-out of the software application and requests access to the secured features from within the software application again, the user will be prompted to enter a credential unless an access or ready signed-in state has returned to that application.

Figure 2:
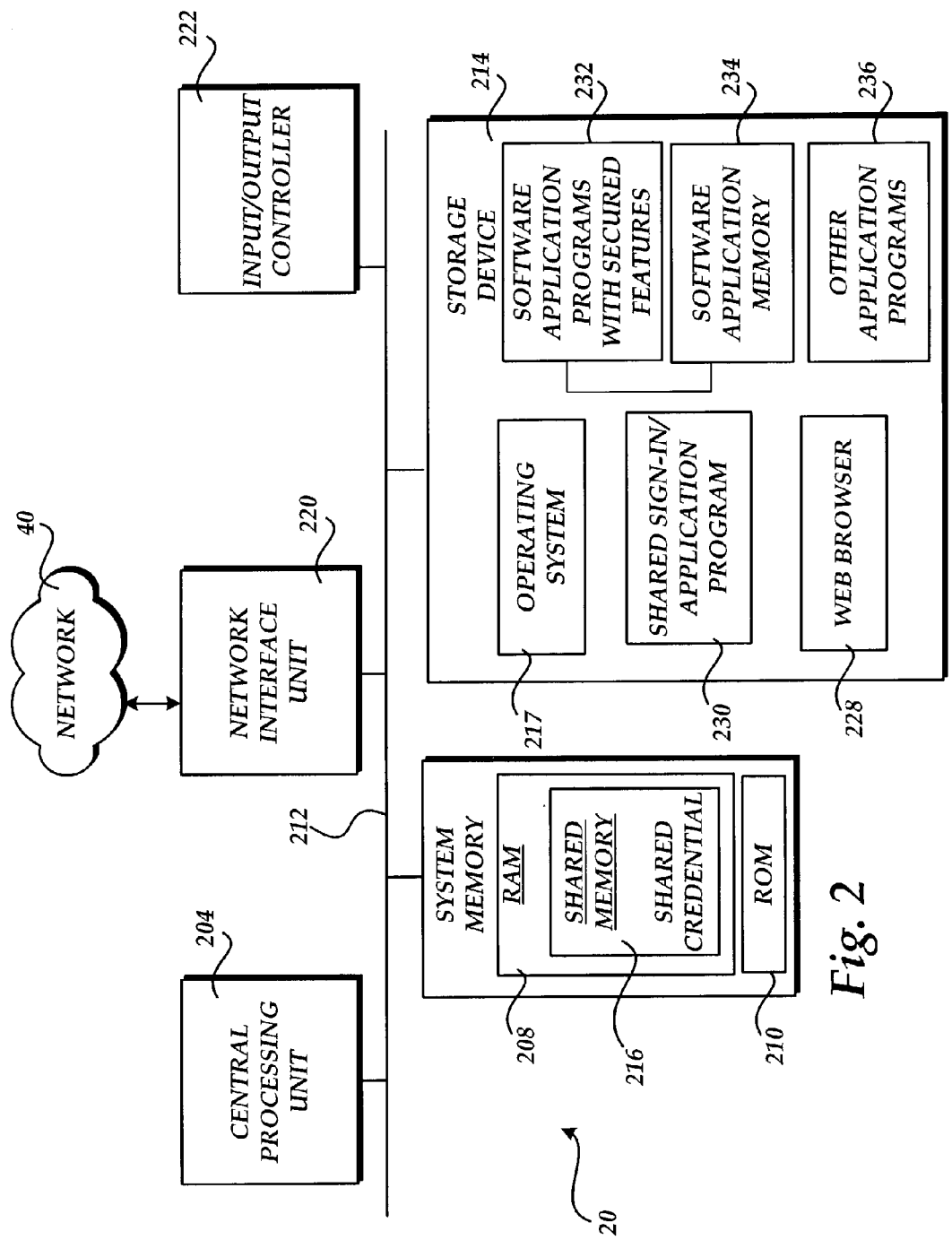
FIG. 2 illustrates one computing environment in which the invention may be implemented.

FIG. 2 illustrates a suitable computing environment in which embodiments of the invention may be implemented. One embodiment of the invention will be described in the general context of computer-executable instructions being executed by a personal computer. Those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network.

With reference to FIG. 2, an exemplary system for implementing the invention includes a general purpose computing device in the form of a conventional client computer 20, including a processing unit 204, a system memory 206, and a system bus 212 that couples various system components including the system memory to the processing unit 204. The system bus 212 may be any of several types of bus structures including a memory bus or memory controller, a peripheral bus, and a local bus using any of a variety of bus architectures. The system memory includes read only memory (ROM) 210 and random access memory (RAM) 208. A basic input/output system 222 (BIOS), containing the basic routine that helps to transfer information between elements within the client computer 20, such as during start-up, is stored in ROM 210.

RAM 208 includes a shared memory 216 where applications with common features retrieve information when needed. The shared memory 216 is created by a dynamic link library (DLL). The shared credential is written to the shared memory 216 in an encrypted format when an initial software application enters an access signed-in or logged-in state. Subsequent software applications that open or run during an access signed-in state or condition retrieve this credential upon request and transmit it to authentication server 60 via network 40 to sign-in. This same credential is cleared from shared memory 216 and RAM 208 when all secured software applications approved or authorized to share sign-in or login are closed, signed-out, or logged-out.

The client computer 20 further includes a storage device 214 for storing an operating system 217, software application programs with secured features 232 such as OFFICE from MICROSOFT CORPORATION of Redmond, Wash., other application programs 236, a standard Web browser application program 228 such as INTERNET EXPLORER from MICROSOFT CORPORATION of Redmond, Wash., and a shared sign-in or login application program 230.

The operating system 217 works in conjunction with authentication information in the form of an encrypted cookie that is sent from authentication server 60 via the network 40 and is stored in the memory 234 for the software application program that requested it. The encrypted cookie gives client computer 20 access to secured features from within a software application 232 via the network 40 once a user has requested access.

The storage device 214 is connected to the CPU 204 through a storage controller (not shown) connected to the bus 212. The storage device 214 and its associated computer-readable media, provide non-volatile storage for the client computer 20. Although the description of computer-readable media contained herein refers to a storage device, such as a hard disk or CD-ROM drive, it should be appreciated by those skilled in the art that computer-readable media can be any available media that can be accessed by the personal computer 20.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

According to various embodiments of the invention, the client computer 20 may operate in a networked environment using logical connections to remote computers through a network 40, such as the Internet. The client computer 20 may connect to the network 40 through a network interface unit 220 connected to the bus 212. It should be appreciated that the network interface unit 220 may also be utilized to connect to other types of networks and remote computer systems. The client computer 20 may also include an input/output controller 222 for receiving and processing input from a number of devices, including a keyboard, mouse, or electronic stylus (not shown in FIG. 2). Similarly, an input/output controller 222 may provide output to a display screen, a printer, or other type of output device.

As mentioned briefly above, a number of program modules and data files may be stored in the storage device 214 and RAM 208 of the client computer 20, including an operating system 217 suitable for controlling the operation of a networked personal computer, such as the WINDOWS XP operating system from MICROSOFT CORPORATION of Redmond, Wash. The storage device 214 and RAM 208 may also store one or more data files. Additional details regarding the operation of shared sign-in or login will be described in greater detail below.

Figure 3:
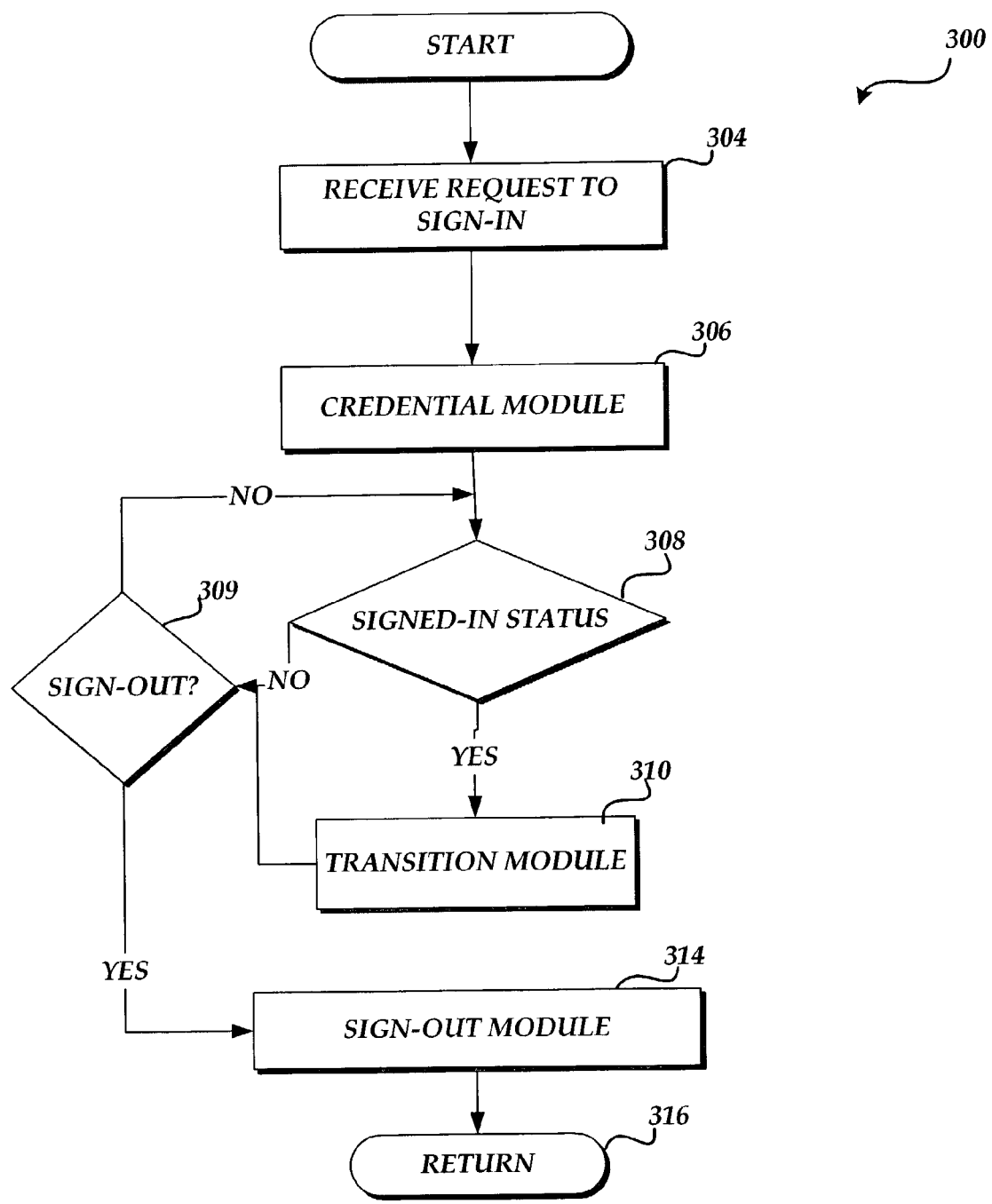
FIG. 3 illustrates a flow of operations to perform a shared sign-in with software applications having secured features in one embodiment of the present invention.

The logical operations of the various embodiments of the present invention are implemented (1) as a sequence of computer implemented acts or program modules running on a computing system and/or (2) as interconnected machine logic circuits or circuit modules within the computing system. The implementation is, a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combi- FIG. 3 illustrates an operational flow 300 executed or performed to sign-in or login to a software application having secured features and initiate a shared sign-in operation. The operational flow 300 begins with receipt operation 304 whereby a software application having secured features is open or running with no other applications being in a signed-in or logged-in state. Receipt operation 304 receives a request to sign-in or login for access to secured features. This operation may be accomplished by recognizing a user input requesting access to secured features.

After receipt operation 304 receives the request, credential module 306 processes or verifies a credential to enter an access signed-in or access logged-in state. First of all credential module 306 prompts the user for a credential. The user enters a credential when prompted and the credential is transmitted to an authentication server 60. Next credential module 306 detects whether the entered credential is authentic or valid. If the credential is authentic or valid, module 306 writes the credential to a shared memory 216 in an encrypted format, increments a reference count, and transitions or advances the software application to an access signed-in or access logged-in state. The access signed-in or logged-in state fully authenticates or validates the user's identity and grants access to secured features. Module 306 then sends notification to all open or running secured applications that a sign-in or login has occurred. Operational flow 300 then advances to signed-in status test operation 308.

Signed-in status test operation 308 detects whether there are any secured applications presently open or in run mode that do not have a signed-in status, including those just opening or starting in run mode. If all the open or running secured applications have transitioned or advanced to a signed-in or logged-in state, operational flow 300 branches NO from test operation 308 to detection operation 309. If there are secured applications in run mode without this status, operational flow 300 branches YES to transition module 310.

Transition module 310 delivers the notification sent by credential module 306 to open or running secured applications, increments the reference count for each transition, and asynchronously changes the state and interface of each application in run mode to a ready signed-in or logged-in state. The ready signed-in or logged-in state grants the software application access to the credential stored in shared memory 216 and places the application in a state of readiness to authenticate and access secured features upon request without prompting user intervention. Operational flow 300 then advances to detection operation 309. Detection operation 309 detects whether any secured applications in an access or ready signed-in or logged-in state have received a sign-out, exit, or logout request. A sign-out or logout request may be initiated by clicking a sign-out button or closing or exiting the software application. If a sign-out, exit, or logout request has not been received, operational flow 300 branches NO and continues to detect whether any secured applications in run mode exist without a signed-in or logged-in status or state by returning to signed-in status test operation 308. If a sign-out, exit, or logout request has been received, operational flow 300 branches YES to sign-out module 314.

Sign-out module 314 clears the shared credential and authentication information from memory 234, decrements the reference count, and sends notification to other secured applications that a sign-out or logout has occurred. Next sign-out module 314 delivers notification of the sign-out or logout to secured applications in an access or ready signed-in or logged-in state, decrements the reference count for each application receiving notification, clears authentication information from memory 234 for each application in an access signed-in or logged-in state, and asynchronously changes the state and interface of the secured applications to a signed-out or logged-out state. Once all the applications have been signed-out, module 314 clears the shared credential from shared memory 216 and returns control to other routines at connector 316.

Figure 4:
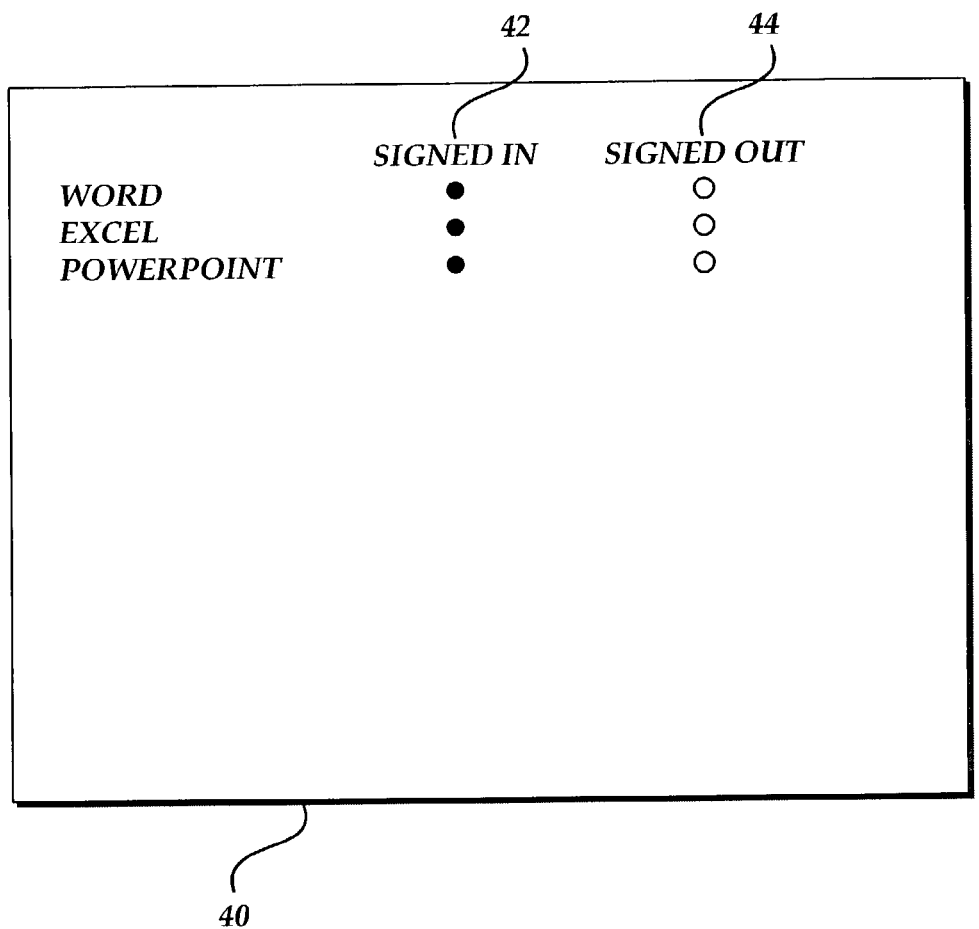
FIG. 4 is a screen diagram showing an illustrative computer display provided by an actual embodiment of the present invention.

Turning to FIG. 4 a screen diagram will be described that shows an illustrative computer display provided by an actual embodiment of the present invention. FIG. 4 shows a user interface 40 that is displayed in response to a secured software application entering an access signed-in state. Column 42 indicates the signed-in or logged-in software applications. Although two applications did not enter an access signed-in or logged-in state, they both have transitioned to a ready signed-in or logged-in state. The user views this as an access signed-in or logged-in state, and when accessing a secured feature in any of the ready signed-in or logged-in state applications, authentication and access will take place without prompting user intervention.

For instance, if WORD enters an access signed-in state, then EXCEL and POWERPOINT share the sign-in and enter a ready signed-in state. When the user selects a secured feature within EXCEL, the shared credential is retrieved from shared memory 216 and authenticated with the user viewing non-pervasive network activity indicators. Prompts to enter a credential will not occur. This embodiment also improves network efficiency by keeping network transmissions to an as-needed basis.

Further, when a user actively signals to sign-out or logout of a secured application, the other applications receive notice and asynchronously sign-out or logout. Display 40 will change the indicators accordingly in columns 44 and 42 to show a signed-out or logged-out condition for all the applications. When all applications have signed-out, shared memory 216 is cleared of the shared credential. Additional details regarding sharing a sign-in and sign-out operation will be provided below.

Figure 5A:
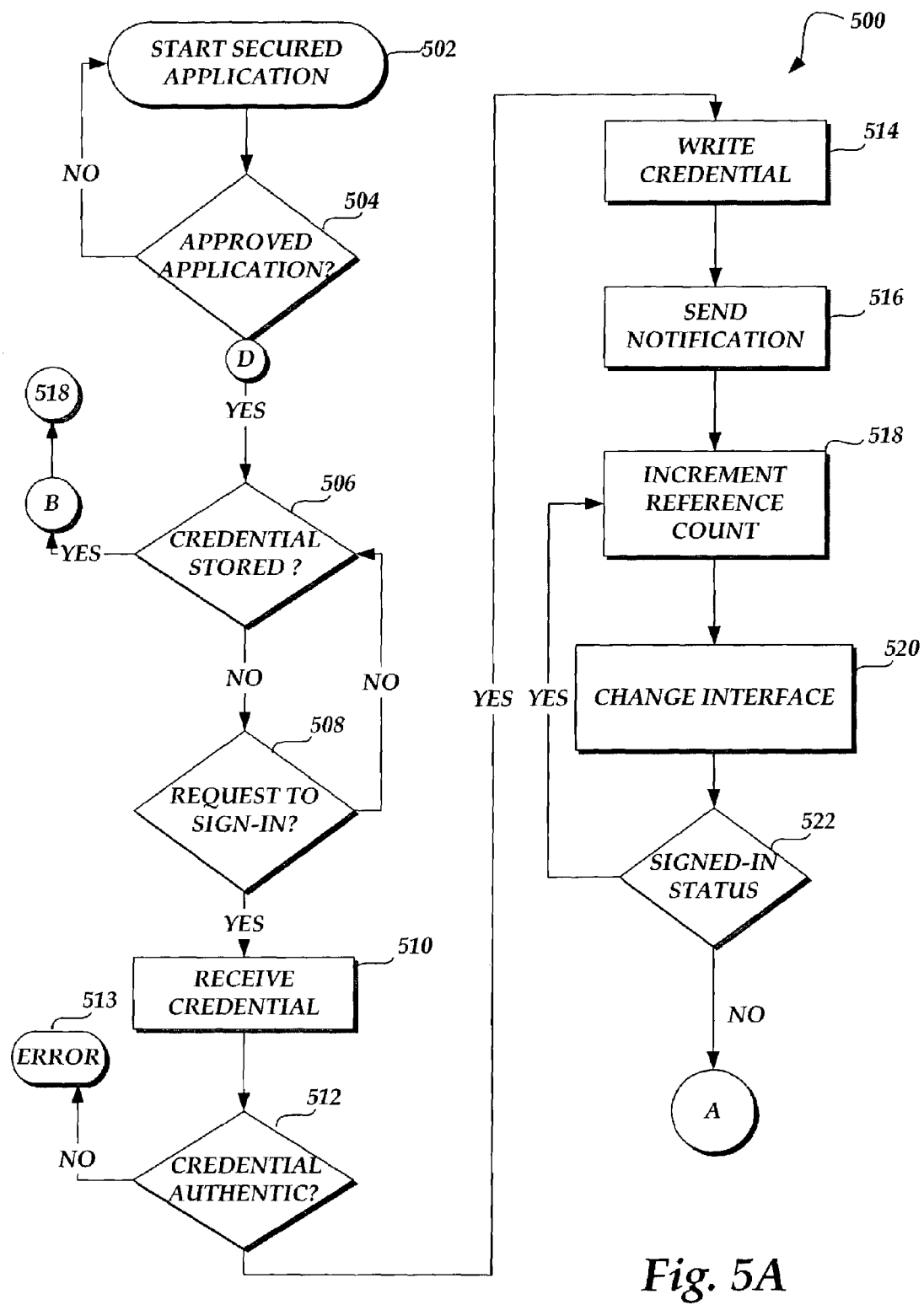
FIGS. 5A-C illustrate another embodiment of the present invention where software applications having secured features share a sign-in and sign-out operation.
Figure 5B:
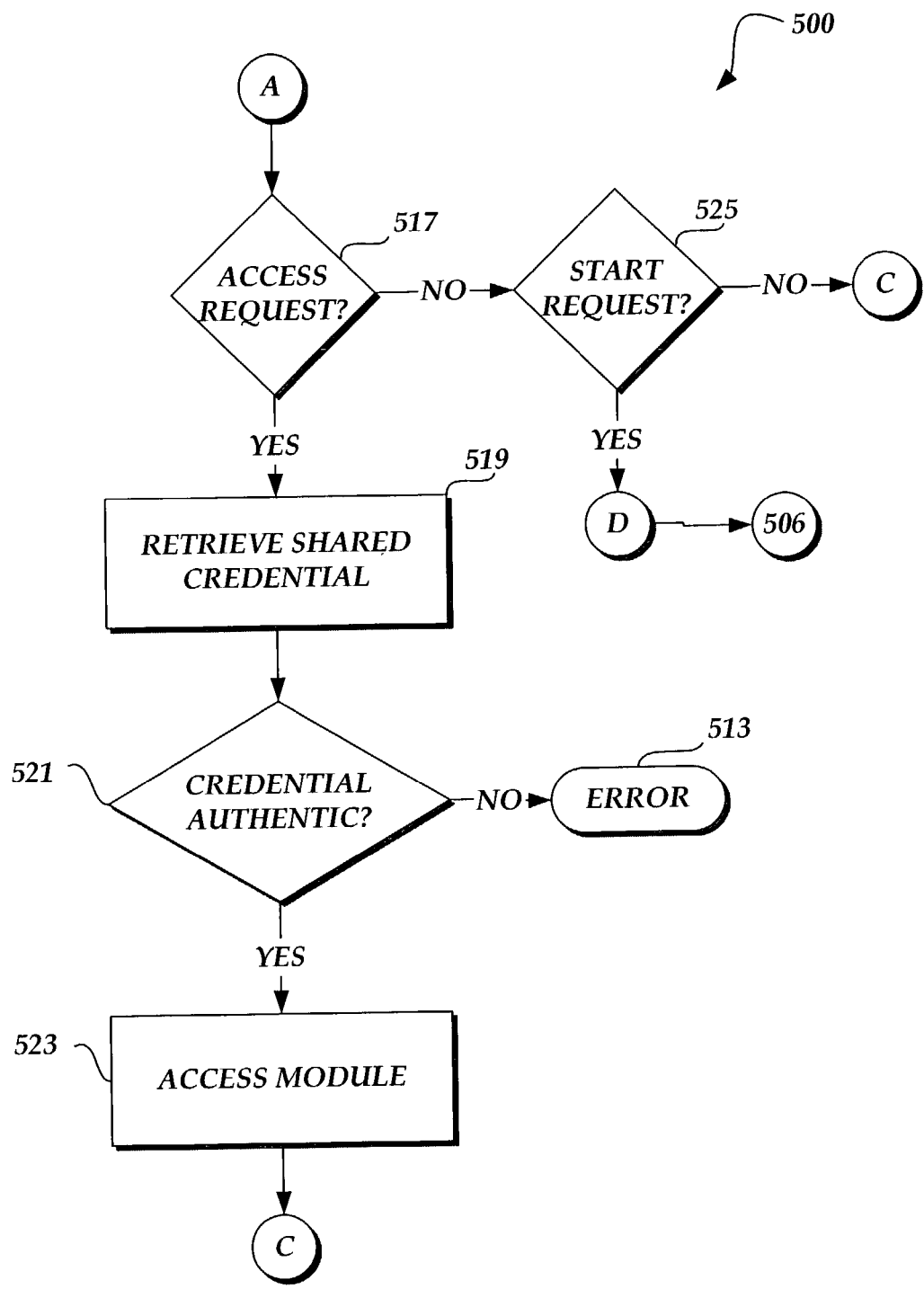
Figure 5C:
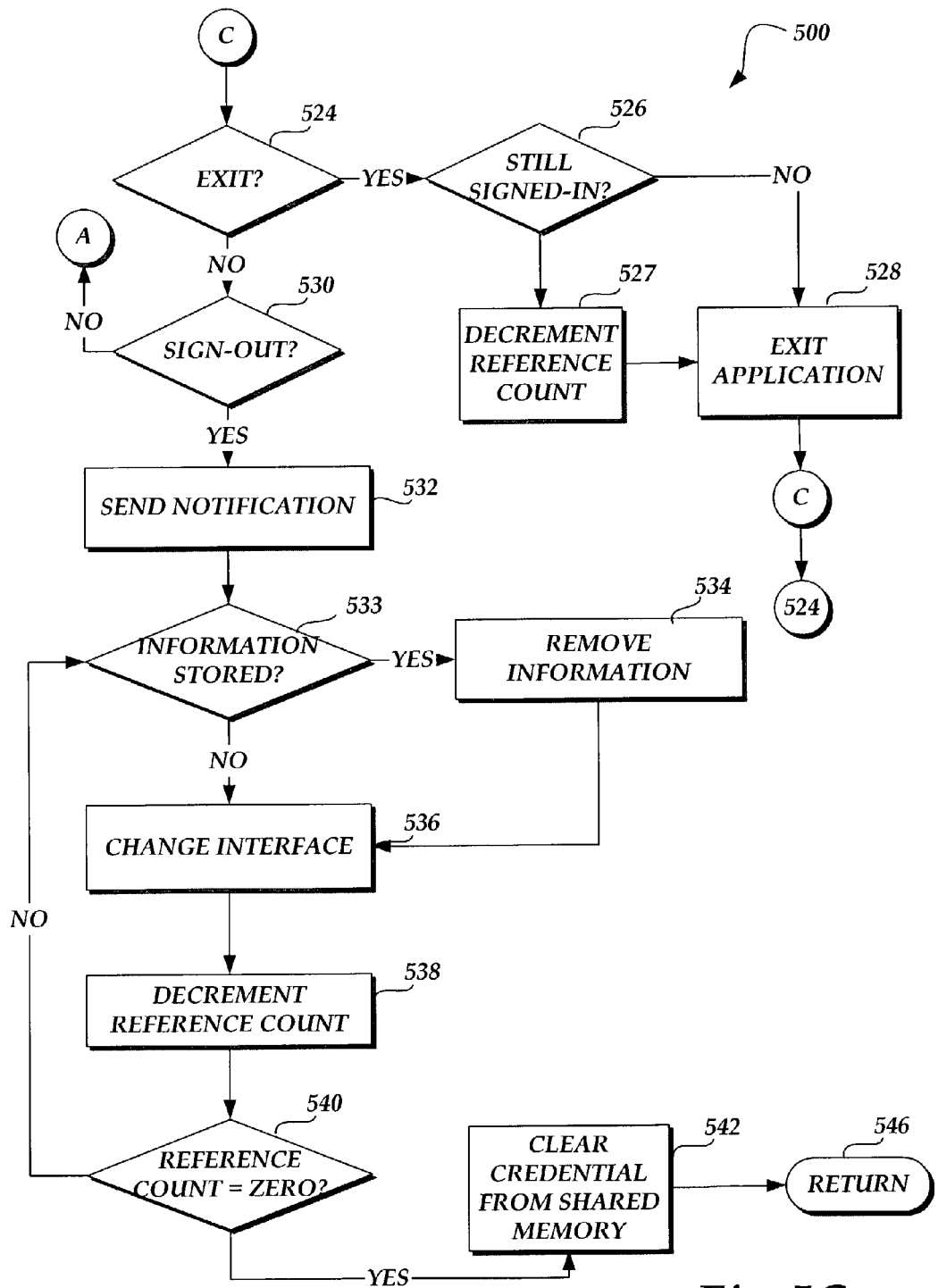

FIGS. 5A-C illustrate another embodiment of the present invention where software applications having secured features share a sign-in or login and thereby a sign-out or logout operation. Operational flow 500 begins with start operation 502, where a software application having secured features is opened or launched into run mode. Next detection operation 504 detects whether the application is approved to share the sign-in or login operation. If the application is not approved, operational flow 500 branches NO and awaits the opening or starting of another application at start operation 502. Applications that are not approved or authorized to share the sign-in operation are not permitted to keep a shared credential active.

If the application is approved or authorized, operational flow 500 branches YES to detection operation 506. Detection operation 506 detects whether a credential is stored in shared memory. If a credential is not present or stored in shared memory then no secured applications are presently in an access signed-in or logged-in state. As a result, operational flow 500 branches NO to detection operation 508. If a credential is present or stored, operational flow 500 branches YES to counter operation 518 described below.

Detection operation 508 detects whether a request to sign-in or login has occurred. If a request to sign-in or login has not occurred, operation flow 500 branches NO to detection operation 506. If a request to sign-in or login has occurred, operational flow 500 branches YES to receipt operation 510 where a credential is requested from the user and received. Next detection operation 512 detects whether the received credential is valid or authentic. This is accomplished by transmitting the credential via network 40 to authentication server 60.

If the credential is not valid or authentic, operational flow 500 branches NO to connector 513 where an error is returned. If the credential is valid or authentic, operational flow branches YES where writing operation 514 writes the credential to shared memory 216 in an encrypted format. Then notification operation 516 sends notice of the sign-in or login to other secured applications that are running. Next counter operation 518 increments the reference count, and interface operation 520 changes display 40 to a signed-in state for the access signed-in application.

After a secured application enters an access signed-in state as described above, operational flow 500 advances to signed-in status test operation 522. Signed-in status test operation 522 detects whether there are any approved secured applications presently open or in run mode that do not have a signed-in status. If all the open or running applications have transitioned or advanced to a signed-in state, operational flow 500 branches NO to detection operation 517 described below. If there are approved applications in run mode without a signed-in status, operational flow 500 branches YES to counter operation 518 described above. Here, running applications that are approved authorized to share sign-in or login are transitioned to a ready signed-in state in an asynchronous manner.

Detection operation 517 detects whether any of the ready signed-in or logged-in state applications have received a request to access a secured feature. If there has been such a request, retrieval operation 519 retrieves the shared credential from shared memory 216. Next detection operation 521 detects whether the credential is authentic or valid. If it is not authentic an error is returned at connector 513. If the credential is authentic or valid, access module 523 receives and stores authentication information in the memory for the ready signed-in application, transitions or advances the application to an access signed-in state, and accesses the requested secured feature. Authentication information may be an authenticated credential in the form of an encrypted cookie received from an authentication server 60. This feature improves network efficiency by limiting network transmissions to an as-needed basis. Next operational flow 500 advances to detection operation 524 described below.

If detection operation 517 does not detect an access request, operational flow 500 continues to detection operation 525, which determines if a request to start an approved or authorized application has been made. If there has been such a request operational flow 500 branches YES to detection operation 506 described above. If there has not been a request to start an approved or authorized application, operational flow 500 branches NO to detection operation 524.

Detection operation 524 detects whether a request to exit an application has been made. If there has been such a request, detection operation 526 determines whether the application that requested the exit is still signed-in or logged-in. If the application is not signed-in or logged-in, the application exits at exit operation 528. Then operational flow 500 advances again to detection operation 524 described above. If the application is still signed-in at detection operation 526, counter operation 527 decrements the reference count and the application exits at exit operation 528. If there is not a request to exit at detection operation 524, detection operation 530 detects whether there has been a sign-out or logout request.

If there has been a request to sign-out or logout, operational flow 500 branches YES to notice operation 532 where notification of the sign-out is transmitted to running applications. Applications are blocked from signing-in or logging-in during the sign-out or logout process. Next detection operation 533 detects whether authentication information has been stored in the memory for the software application signing or logging out. If the authentication information has been stored removal operation 534 then removes the credential and authentication information from the memory 234 for the application and operation flow 500 continues to interface operation 536 described below. If the authentication information has not been stored operational flow 500 continues from detection operation 533 to interface operation 536 where interface 40 of the software application is changed to a signed-out or logged-out state or condition. Next counter operation 538 decrements the reference count and operational flow 500 then continues to detection operation 540.

Detection operation 540 determines if the reference count equals zero, thereby indicating that all approved or authorized software applications have been signed-out or logged-out. If the reference count does equal zero, operational flow 500 branches YES where the credential is cleared or removed from shared memory 216 by deletion operation 542 and control is returned to other routines at connector 546. If the reference count does not equal zero, operational flow branches NO to detection operation 533 described above. This branch will continue to sign-out or logout all secured applications in an access or ready signed-in state or condition until the reference count equals zero.

If detection operation 530 detects that a sign-out or logout request has not been initiated, operational flow 500 continues to detection operation 517 described above.

While the invention has been particularly shown and described with reference to embodiments thereof, it will be understood by those skilled in the art that various other changes in the form and details may be made therein without departing from the spirit and scope of the invention.

We claim:

1. A method for sharing a sign-in operation among two or more software applications, wherein the software applications each have one or more secured features comprising:

receiving a request to sign-in to a first running software application in order to have access to the secured features of the first running software application;

processing a same credential to enter an access signed-in state within the first running software application to grant access to the secured features of the first running software application and secured features of other software applications wherein processing the same credential comprises:

receiving a credential;

detecting whether the credential is authentic; and in response to the credential being authentic, receiving and storing authentication information, writing the credential to a shared memory, and sending notification to the other running software applications indicating an access sign-in has occurred without authenticating any secured featured;

in response to entering the access signed-in state within the first running software application, detecting whether one or more of the other software applications with secured features are running; and in response to the access signed-in state and to one or more other software applications with secured features running, transitioning one or more of the other running software applications to a ready signed-in state with access to the same credential for granting access to the secured features of the other software applications;

wherein the other running software applications comprise software applications in run mode and software applications that are starting.

2. The method of claim 1, wherein transitioning the other running software applications comprises:

receiving notification that the access sign-in has occurred; and in response to receiving notification, changing an interface of each software application in run mode to indicate a signed-in state.

3. The method of claim 2, wherein transitioning the other running software applications further comprises:

detecting whether a credential is stored in the shared memory; and in response to the credential being stored, changing an interface of each software application starting to the signed-in state.

4. The method of claim 3, wherein the signed-in state comprises the access signed-in state or the ready signed-in state.

5. The method of claim 4, further comprising:

receiving a request to access a secured feature within a software application when the software application is in the ready signed-in state;

in response to receiving the request, retrieving the credential from the shared memory;

detecting whether the credential is authentic; and in response to the credential being authentic, receiving and storing authentication information for accessing the secured feature of the software application without authenticating the secured feature whereby the software application is transitioned from the ready signed-in state to the access signed-in state and the secured feature is accessed.

6. The method of claim 5, wherein detecting whether the credential is authentic comprises:

transmitting the credential for authentication;

verifying an identity of the credential; and in response to the identity of the credential being verified, validating the credential.

7. The method of claim 6, wherein the credential is stored and transmitted in an encrypted format and wherein authentication information comprises an encrypted cookie.

8. The method of claim 7, further comprising sharing a sign-out operation among two or more software applications, wherein the software applications have one or more secured features comprising:

receiving a request to sign-out of a software application when in a signed-in state;

sending a message indicating a sign-out has occurred to the other running software applications;

detecting whether authentication information is stored in a memory for the software application requesting sign-out;

in response to authentication information being stored, removing the authentication information from the memory for the software application; and transitioning each running software application from a signed-in state to a signed-out state.

9. The method of claim 8, wherein the software applications are authorized to share the sign-in operation, further comprising:

in response to transitioning each running software application to a signed-in state, incrementing a reference count for each running software application transitioned to a signed-in state; and in response to transitioning each running software application from a signed-in state to a signed-out state, decrementing the reference count for each running software application transitioned to a signed-out state.

10. The method of claim 9, wherein the reference count comprises the number of software applications currently in the access signed-in state or the ready signed-in state.

11. The method of claim 10, wherein the credential comprises a username and a password.

12. The method of claim 10, wherein transitioning each running software application to a signed-out state further comprises changing an interface of each running software application to a signed-out state.

13. The method of claim 10, further comprising:

detecting if the reference count is zero; and in response to the reference count being zero, clearing the credential from the shared memory.

14. The method of claim 13, further comprising:

receiving a request to exit a software application;

detecting whether the software application is in a signed-in state; and in response to the software application being in a signed-in state, decrementing the reference count and exiting the software application.

15. The method of claim 14, further comprising in response to the software application not being in a signed-in state, exiting the software application.

16. A computer program product readable by a computing system and encoding instructions for executing a computer process for logging-in to a software application, wherein the software application has one or more secured features, the computer process comprising:

receiving a request to enter a logged-in state within a single software application in order to have access to the secured features of the single application;

verifying a credential to enter an access logged-in state within the single software application; to grant access to the secured features of the single software application and secured features of other software applications;

detecting whether one or more other software applications are open;

in response to one or more other software applications being open, advancing the open software applications to a ready logged-in state with access to the same credential for granting access to the secured features of the other software applications;

receiving a request to access a secured feature within the software application when the software application is in a ready logged-in state;

in response to the request, retrieving and transmitting the credential for validation; and in response to the credential being validated, receiveing and storing authentication information and advancing the software application from the ready logged-in state to the access logged-in state.

17. The computer storage media of claim 16, wherein verifying a credential comprises:
    receiving a credential;
    detecting whether the credential is valid;
    in response to teh credential being valid, writing the credential to a shared memory; and
    sending a message indicting an access login has occurred to the open software applications.

18. The computer storage media of claim 17, wherein the computer process futther comprises:
    detecting whether one or more other software applications are starting; and
    in response to one or more other software applications starting, advancing each starting software application to a ready logged-in state with access to the credential.

19. The computer storage media of claim 18, wherein advancing the starting applications to a ready logged-in state comprises:
    detecting whether the credential is stored in the shared memory;
    in response to the credential being stored, changing an interface of each starting software application to a logged-in state; and
    incrementing a reference count for each starting software application advanced to the ready logged-in state.

20. The computer storage media of claim 19, wherein advancing the other open applications to the ready logged-in state comprises:
    receiving the message indicating the access login has occurred;
    changing an interface of the open application to a logged-in state; and
    incrementing the reference count for each open application advanced to the ready logged-in state.

21. The computer storage media of claim 19, wherein the credential is stored and transmitted in an encrypted format.

22. The computer storage media of claim 20, wherein the reference count comprises the number of software applications presently in a logged-in state.

23. The computer storage media of claim 20, further comprising sharing a logout operation between two or more software applications, wherein the software applications have one or more secured features comprising:
    receiving a request to logout of a software application when in the logged-in state;
    detecting whether authentication information is stored in a memory for the software application;
    in response to authentication information being store, removing the authentication information from the memory for the software application;
    sending a message indicating a shared logout has occurred to the other open software applications; and
    advancing each software application to a logged-out state.

24. The computer storage media of claim 23, wherein the software applications are approved to share the login and logout operations, further comprising:
    in response to advancing each open software application to a logged-in state, incrementing a reference count for each open software application advanced to a logged-in state; and
    in response to advancing each software application to a logged-out state, decrementing the reference count for each software application advanced to a logged-out state.

25. A system for sharing a sign-in operation among two or more applications, each application having at least one secured feature, the system comprising:
    a receipt module receiving a request to sign-in to a first running software application having a secured feature;
    a credential module validating a sign-in input for the first running software application and changing the state of the first running software application to an access signed-in state indicating access to a secured feature;
    a transition module responsive to the credential module and detecting that a second software application is running changing the state of a second running software application having a secure feature to a ready signed-in state with access to the sign-in input;
    a memory unit storing a shared credential in a shared memory; and
    a processing unit receiving a request to access a secured feature within a software application when the software application is in the ready signed-in state, in response to receiving the request, retrieving the shared credential from the shared memory, detecting whether the sign-in is authentic, and in response to the sign-in input being authentic, receiving and storing authentication information for accessing the secured feature of the second software application whereby the second software application is transitioned from the ready signed-in state to the access signed-in state and the secured feature is accessed.

26. The system of claim 25, further comprising a sign-out module responsive to a sign-out request changing the state of the running applications to a signed-out state.

* * * * *